Jan. 24, 1967     K. A. BEVINGTON     3,299,488
TUBE CHAMFERING AND FINISHING DEVICE
Filed Aug. 17, 1964     2 Sheets-Sheet 1
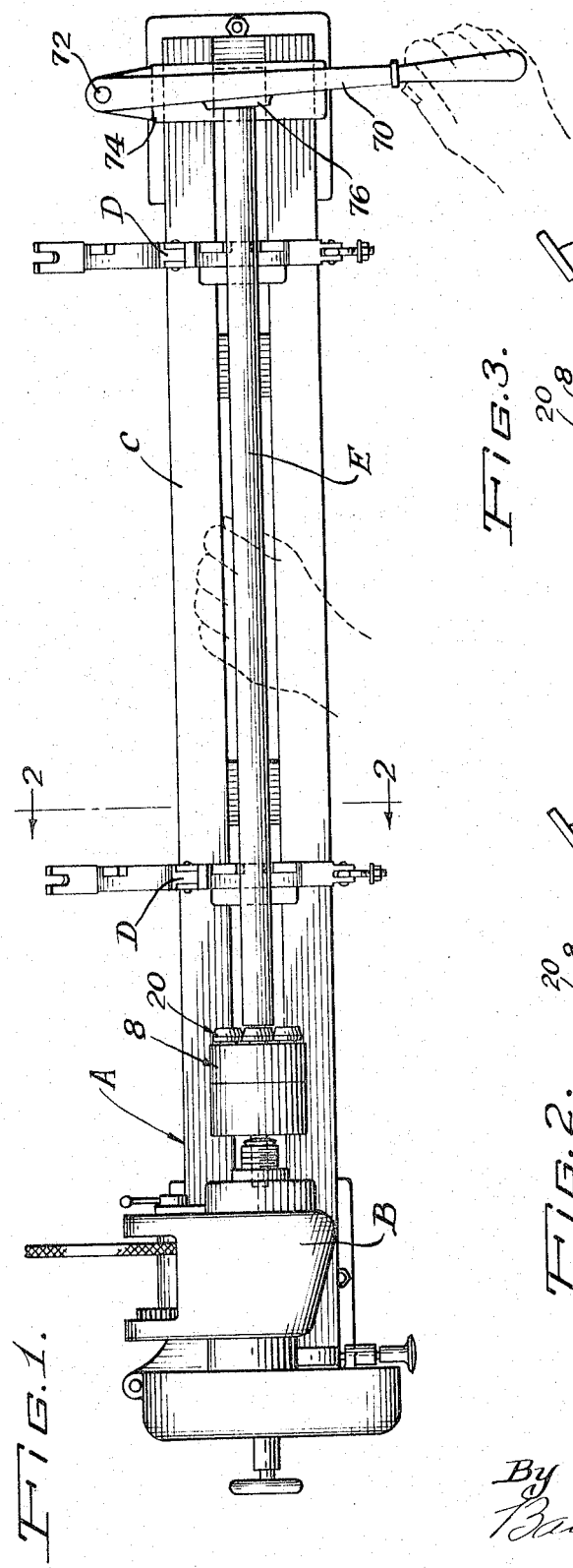
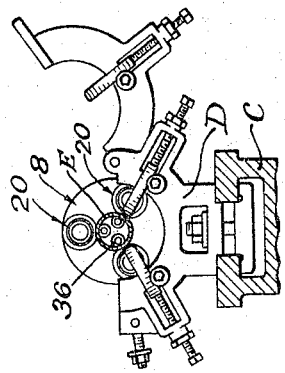
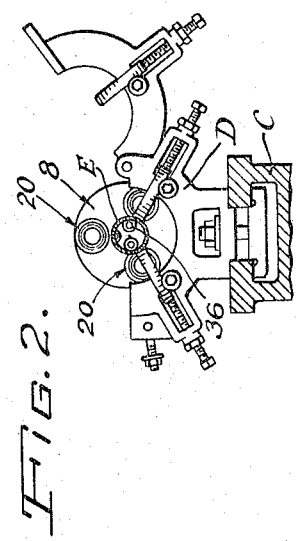
Inventor:
Kenneth A. Bevington
By
Bair, Freeman & Molinare
Attys.

Jan. 24, 1967   K. A. BEVINGTON   3,299,488
TUBE CHAMFERING AND FINISHING DEVICE
Filed Aug. 17, 1964   2 Sheets-Sheet 2
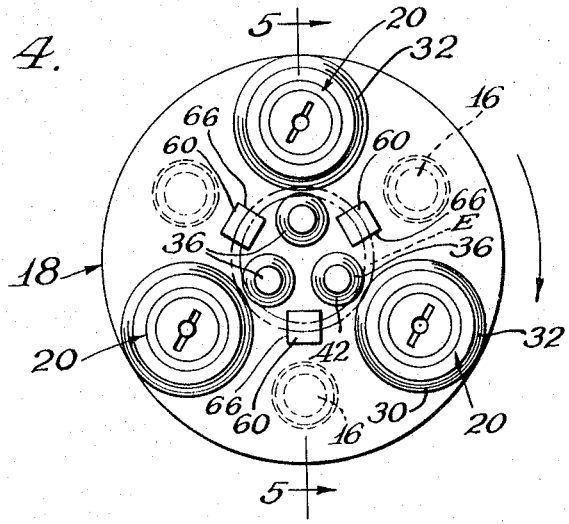
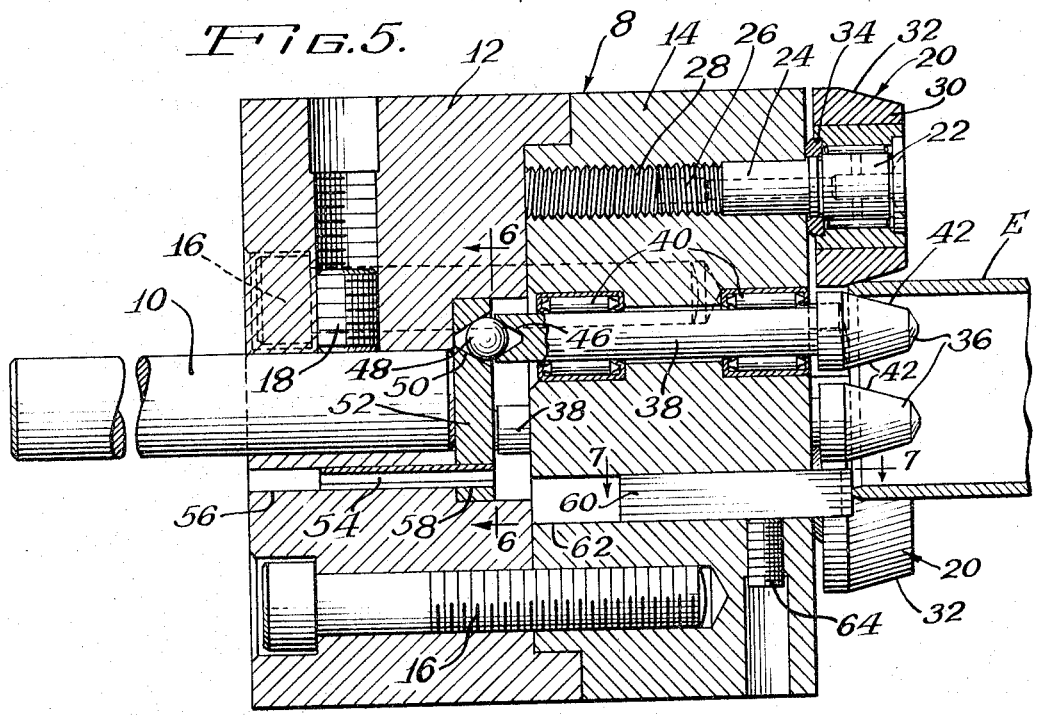
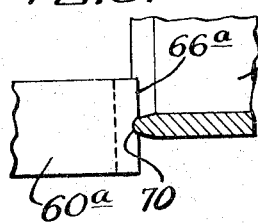
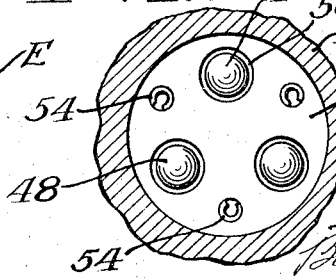
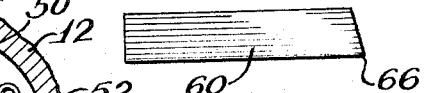
Inventor:
Kenneth A. Bevington
By
Bair, Freeman & Molinare
Attys.

United States Patent Office 3,299,488
Patented Jan. 24, 1967

3,299,488
TUBE CHAMFERING AND FINISHING DEVICE
Kenneth A. Bevington, 2755 Broadway,
Evanston, Ill. 60201
Filed Aug. 17, 1964, Ser. No. 389,857
13 Claims. (Cl. 29—57)

The present invention relates to apparatus for chamfering and finishing the ends of preformed, rolled metal tubes.

Preformed, rolled metal tubes are extensively used in various fields and various industries. Such tubes are initially cut to the approximate predetermined or desired length, which practice results in the production of cutting burrs and sharp edges at the ends of the tubes. For most uses, it is desired to treat or finish the cut ends of the tubes so as to reduce or eliminate the cut burrs, and to obtain true or smooth faced surfaces at the ends of the tubes. For many uses it is also highly desired that either or both the inner and outer surfaces of the end portions of the tubes be chamfered. For some uses it is necessary or desirable that the end faces of the tubes be accurate and smooth so as to permit proper alignment with or connection to another member or element, such as for example, when used as push rods in engines. It is also desirable that accurate facing and deburring of the cut ends of the tubes be provided in order to reduce possible injury to workmen in handling of the tubes, such as in the production of various objects or in bending or in flaring of portions of the tubes for various uses. For some uses it is also highly desirable that the ends of such tubes be accurately faced, deburred, and sometimes chamfered for the purpose of providing an improved appearance, depending on the particular nature of use of the tube, such as for example, when a plug, or cap, or fixture is applied to the end of the tube.

In prior available apparatus for chamfering and facing the ends of preformed metal tubes, the tube is usually gripped and held relatively firm to prevent transverse movement during the time that chamfering and facing operations are performed thereon. Because such preformed, rolled metal tubes cannot always be produced in true cylindrical form, and because frequently camber is produced in the tubing incident to its manufacture, sometimes the tubing is slightly out of round and sometimes the tubing is produced with dimples. Because of such defects existent in tubing produced by present processes and equipment for manufacturing sheet metal rolled tubing, it will be apparent that when the ends of a section of tube are rigidly held against lateral movement for finishing of the ends, the facing produced is not true and accurate, nor is the chamfering of the inner and/or outer surfaces true and uniform around the entire periphery of the outer and inner surfaces of the end portion of the tube. While with great care and use of auxiliary equipment it is possible to provide a true and accurate face at the end of the tube, and to provide a uniform and smooth continuous chamfer on the inner and outer surfaces at the end of the tube, such accomplishments, because of the substantial consumption of time, are extremely costly.

One of the objects of the present invention is to provide an improved apparatus which eliminates the difficulties and disadvantages of prior apparatus used for facing and chamfering of the ends of a preformed sheet metal tube, by virtue of which the end faces of a tube may be accurately and smoothly finished and chamfering may be applied to the ends of the tube in a uniform manner, throughout the entire periphery of the outer and inner surfaces of the end portions of the tube in an expeditious and economical manner.

Another object is to provide an improved apparatus of the character indicated which permits the tube to be faced and chamfered to become properly located and centered with respect to the tool, in a manner so as to insure obtaining uniform chamfering and facing of the tubes, even when the tubes are slightly cambered or slightly out of round or dimpled, incident to their fabrication.

A further object is to provide an improved apparatus of the character indicated which is relatively simple in construction, economical to manufacture, and which is capable of efficient and economical use for producting accurate facing at the ends of the tubes as well as accurate and uniform chamfering of the outer and inner surfaces of the end portions of the tubes.

Other objects and advantages of this invention will be apparent from the following description, taken in connection with the accompanying drawings in which:

FIGURE 1 is a top plan view of a portion of a lathe including apparatus embodying the present invention.

FIGURE 2 is a vertical sectional view through the bed portion of the lathe, taken as indicated at line 2—2 on FIGURE 1, showing a tube as it is initially supported with its approximate center or axis located slightly below the axis of rotation of the tool head assembly.

FIGURE 3 is a view similar to FIGURE 2 showing the position assumed by the tube when it has been moved into operative relation to the tool head.

FIGURE 4 is an enlarged end view of the rotatable tool head.

FIGURE 5 is an axial sectional view, on further increased scale, taken as indicated at line 5—5 on FIGURE 4.

FIGURE 6 is a fragmentary sectional view through a portion of the rotatable head, taken as indicated on line 6—6 of FIGURE 5.

FIGURE 7 is a top plan view of a cutting tool, taken as indicated at line 7—7 on FIGURE 5.

FIGURE 8 is a fragmentary view, on a further enlarged scale showing the relationship of a cutting tool to the end of a tube being faced, and the tool being formed so as to provide a rounded contour to the end face of the tube.

For convenience in illustration, the present invention is shown in association with a conventional lathe, indicated generally at A, including a motor driven head stock B, and having a supporting base or bed C on which are mounted a pair of spaced apart, conventional steady rests, indicated generally at D, for cooperating with and initially supporting the article to be worked upon, and in the present instance being a length of preformed, rolled, sheet metal tubing, indicated at E. It is apparent, that if desired, I may employ suitable V blocks on the base C to serve the same purpose as the steady rests D, because the top portions of the steady rests are not used, but assume a position as seen in FIGURES 2 and 3.

More specifically, the present invention includes a rotatable tool head assembly 8, having a stub shaft 10, adapted to be mounted in a chuck associated with the head stock B of the lathe for supporting and rotating the tool head assembly. The tool head assembly is rotatable as a unit and is formed of two main cylindrical parts or sections 12 and 14 which are rigidly and detachably secured together by three machine screws 16. The stub shaft 10 is fixedly secured with respect to the rotatable head by a set screw 18.

Mounted on the outer end or face of the head is a plurality of outside roller assemblies, herein shown as three, as indicated by the reference numeral 20. The outside roller assemblies are circumferentially spaced apart and each is composed of a conventional roller bearing assembly 22, provided with a stud 24, formed with a threaded portion 26, for engagement in a threaded bore 28, formed in the front section 14 of the rotatable head. Press fitted on the outer race of each roller bearing assembly is a roller 30, having an outer wall portion, indicated at 32, of frusto-conical formation. Each roller bearing assembly also includes a thrust collar or ring 34 which seats against the end surface of the rotatable head. By virtue of this construction the roller 30 and the outer race of the roller bearing are free to rotate.

The frusto-conical surfaces of the three outer rollers 20 cooperate to define a guide zone for the end portion of the tube E, as seen in FIGURE 5 of the drawings. Mounted within the area defined by the three outer rollers 20, are three inner rollers 36, each being formed with an integral stub 38, which is journal supported in a pair of spaced apart, roller bearings 40, recessed in opposite ends of the front section 14 of the rotatable head, as seen in FIGURE 5 of the drawings. Each of the inner rollers also have a portion of their outer surfaces shaped to provide a frusto-conical surface, as indicated at 42. The free end of the stud 38 of each inner roller is formed with a frusto-conical seat 46, cooperating with a ball bearing 48, which in turn is seated in a frusto-conical recess 50, formed in a plate 52, recessed in the front end portion of the second or rear section 12 of the head. The plate 52 is firmly held in position by a plurality of split pins 54, which extend through openings 56 in the section 12 of the head assembly and into correspondingly aligned openings 58 formed in the plate 52. By virtue of the construction described, the inner rollers 36, together with their stub shaft portions 38, are freely rotatable in the bearings 40 and the end inthrust imposed on these rollers is accommodated by the ball bearings 50. As may be seen in the drawings the three rollers 36 are circumferentially spaced apart and positioned with their axes in radial alignment with axes of the three outer rollers 20.

It will be noted that the axes of the outer rollers 20 and the inner rollers 36 all extend in the same general direction as the axis of rotation of the head 8. While I have shown each of the inner rollers positioned in opposed relation to one of the outer rollers, they need not necessarily be so arranged. The arrangement as shown, with at least one outer roller 20 and one inner roller 36, positioned in opposed relation is preferable, in order that an inner and outer roller simultaneously coact with opposite outer and inner surfaces respectively of the end portions of the metal tube E, while it is being processed, to form a chamfer on the outer and the inner surfaces of said end portion of the tube.

Mounted in the head are three cutting tools 60, fitted into openings 62, formed in the front section 14 of the rotatable head, and these tools are fixedly secured in a desired adjusted position by screws 64. The cutting edge 66 of each cutting tool is the leading edge with respect to the direction of rotation of the head, as indicated by the arrow in FIGURE 4 of the drawings. These cutting tools serve to cut an accurate and smooth face on the end of the tube E, incident to rotation of the head.

As may be noted in FIGURE 2 of the drawings, the tube E is initially supported by the steady rests D, with its approximate axis located slightly below the axis of rotation of the head 8. When a piece of tubing E is in supported position with respect to steady rests D it may be lightly held in the rests by one hand of the operator. The tube is then moved axially and forcibly toward the rotatable head, and in doing so the outer and inner rollers 20 and 36 engage the outer and inner surfaces of the end portion of the tube for performing a swaging action thereon and thereby forming a uniform chamfer around the entire outer and inner surfaces of the end portion of the tube. Any suitable means may be employed for forcibly moving the tube axially toward the head, and as shown in FIGURE 1 of the drawings, a hand lever 70 is pivotally mounted at 72 on a supporting bracket 74 carried on the lathe bed C. The handle 70 is formed with a pad 76 for engaging the outer end of the tube E so that upon movement of the handle to the left of the position seen in FIGURE 1, while the tube is being somewhat confined by the other hand of the operator the end of said tube is forced into engagement with the rollers and cutting tools 60. Because the tube is relatively free to move in an upward direction, the tube, when it encounters the rollers, tends to center itself with respect to the sets of rollers and the axis of rotation of the head, with the inner set being telescoped interiorly of the tube while the outer surface of the tube is telescoped between and against the three outer rollers. This arrangement takes care of the slight eccentricities and defects in the tube which occur in normal production of such tubes. When end pressure is being applied to the tube causing the end portion to engage between the two sets of rollers, to form chamfers on the outer and inner surfaces of the end portion of the tubes, said end portion of the tube is also moved into contact with the cutting edges of the cutting tools 60 to form an accurate and smooth cut end face on the tube, and at same time eliminate cutting burrs on the tube.

For certain uses of the tubing it is desired that the end face thereof be rounded and to accomplish this, I provide a modified form of tool, as seen in FIGURE 8, and designated as 60a. This modified tool has its cutting edge 66a formed with a desired contour, in the nature of an arcuate groove 70. It is to be understood that true and accurate end facing, as produced by the tool 60, or the rounded end facing, as produced by the tool 60a, on the tube E, occurs substantially simultaneously with the production of the chamfered surfaces on the end portion of the tube. In prior practices it has not been possible to always obtain accurate and smooth cut or rounded end faces on the tube because of eccentricities and irregularities of the tube. Highly satisfactory formation of true and accurate end faces or rounding of the end face of the tubes is attainable by virtue of this invention because of the roller arrangement and the manner of supporting of the tube, causes the tube to find its own center in relation to the axis of the rotation of the head, and by virtue of which the outer and inner rollers form uniform and continuous chamfered surfaces on the outside and inside of the end portion of the tube. Highly satisfactory results are also attainable even when the tubes have a chamber therein, or when tubes are slightly out of round or have dimples therein, all resulting from initial manufacture. It has been found that tubes that are slightly out of round, or have dimples adjacent the end thereof, by reason of being subjected to the action of the rollers having frusto-conical surfaces, tend to assume a more truly circular contour and tend to reduce or eliminate the dimpled formation.

While I have herein shown and described my present invention as applied to a lathe, manifestly the concept is intended for adaptation to various other types of equipment, including those specially designed for performing the aforesaid operations on tubing. It is also to be understood that the inventive concept herein involved is applicable to an automatic machine wherein the separate tube units are mechanically handled and moved into and out of operative relation to the rotatable cutting head.

Although I have herein shown and described one embodiment of my present invention, manifestly it is capable of modification and rearrangement of parts. I do not therefore, wish it to be understood as limiting my invention to the precise embodiment herein disclosed, except that as I may be so limited by the appended claims.

I claim:

1. A tool assembly of the character described, comprising a head rotatable about an axis, and a plurality of outside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and serving when said head is rotating and the end of said tube is forcibly moved into the guide zone under pressure, to engage the outer surface of the end of the tube for performing a swaging action on and forming a uniform chamfer around the entire outer surface of said end of the tube.

2. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and serving when said head is rotating and the end of said tube is forcibly moved into the guide zone under pressure, to engage the outer surface of the end of the tube for performing a swaging action on and forming a uniform chamfer around the entire outer surface of said end of the tube, and means for initially supporting the metal tube with its axis positioned slightly below the axis of said head to permit said tube to rise and center said end thereof with respect to the axis of the head when said end is forced into the guide zone of the head.

3. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are fixedly relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and serving when said head is rotating and the end of said tube is forcibly moved into the guide zone under pressure, to engage the outer surface of the end of the tube for performing a swaging action on and forming a uniform chamfer around the entire outer surface of said end of the tube, and a cutting tool fixedly mounted on said one end of the head, intermediate an adjacent pair of said rollers for facing said end of the tube when the latter is forcibly moved into said guide zone.

4. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and serving when said head is rotating and the end of said tube is forcibly moved into the guide zone under pressure, to engage the outer surface of the end of the tube for performing a swaging action on and forming a uniform chamfer around the entire outer surface of said end of the tube, and a cutting tool fixedly mounted on said one end of the head, intermediate an adjacent pair of said rollers for rounding and finishing said end of the tube when the latter is forcibly moved into said guide zone.

5. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and an inside roller mounted on a stud fixedly secured in said end of the head and journaled for free rotation about an axis which is fixed relatively to and extending in the direction of the axis of the head and located on a radius inside the radius of the axis of said plurality of rollers, said inside roller having a frusto-conical wall portion, said outside and inside rollers serving, when said head is rotating and the end of said tube is forcibly moved into the guide zone under pressure, to engage the outer and inner surfaces of the end of the tube for performing a swaging action on and forming a uniform chamfer around the outer and the inner surfaces of said end of the tube.

6. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are relative to and extending in the direction of the axis of the head and each having a frusto-conical outer wall portion, said wall portions of said rollers cooperating to provide a guide zone for the reception and centering of a freely movable end of a preformed metal tube relative to the axis of the head, an inside roller mounted on a stud fixedly secured in said end of the head and journaled for free rotation about an axis which is fixed relatively to and extending in the direction of the axis of the head and located on a radius inside the radius of the axis of said plurality of rollers, said inside roller having a frusto-conical wall portion, said outside and inside rollers serving, when said head is rotating and the end of said tube is forcibly moved into the guide zone under pressure, to engage the outer and inner surfaces of the end of the tube for performing a swaging action on and forming a uniform chamfer around the outer and the inner surfaces of said end of the tube, and a cutting tool fixedly mounted on said one end of the head, intermediate an adjacent pair of said outside rollers, for facing the end of said tube when the latter is forcibly moved into said guide zone.

7. A tool assembly of the character described, comprising a head rotatable about an axis, a plurality of outside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions of said rollers cooperating to provide a guide zone for the reception and centering of a freely movable end of a preformed metal tube relative to the axis of the head, and an inside roller mounted on a stud fixedly secured in said end of the head and journaled for free rotation about an axis which is fixed relatively to and extending in the direction of the axis of the head and located on a radius inside the radius of the axis of said plurality of rollers, said inside roller having a frusto-conical wall portion, and having its axis located in the same radial plane of one of said outside rollers, said outside and inside rollers serving, when said head is rotating and the end of said tube is forcibly moved into the guide zone under pressure, to engage the outer and inner surfaces of the end of the tube for performing a swaging action on and forming a uniform chamfer around the outer and the inner surfaces of said end of the tube.

8. A tool assembly of the character described, comprising a head rotatable about an axis, and a plurality of inside rollers mounted on studs fixedly secured in one end of the head in circumferentially spaced apart relation, around the axis of the head, said rollers being separately journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, and serving, when said head is rotating and the end of tube is forcibly moved under pressure into engagement with the wall portions of said rollers for performing a swaging action on and forming a uniform chamfer around the entire inner surface of said end of the tube.

9. A tool assembly of the character described, comprising a head rotatable about an axis, a plurality of inside rollers mounted on studs fixedly secured in one end of the head in circumferentially spaced apart relation, around the axis of the head, said rollers being separatedly journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, and serving, when said head is rotating and the end of tube is forcibly moved under pressure into engagement with the wall portions of said rollers for performing a swaging action on and forming a uniform chamfer around the entire inner surface of said end of the tube, and means for initially supporting the metal tube with its axis positioned slightly below the axis of said head to permit said tube to rise and center said end thereof with respect to the axis of the head when said end of tube is forced telescopically over said rollers.

10. A tool assembly of the character described, comprising a head rotatable about an axis, a plurality of inside rollers mounted on studs fixedly secured in one end of the head in circumferentially spaced apart relation, around the axis of the head, said rollers being separatedly journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, and serving, when said head is rotating and the end of tube is forcibly moved under pressure into engagement with the wall portions of said rollers for performing a swaging action on and forming a uniform chamfer around the entire inner surface of said end of the tube, and a cutting tool fixedly mounted on said one end of the head, in a radial plane intermediate the radial planes passing through the axes of two adjacent rollers for facing said one end of tube when the latter is forcibly moved over the rollers.

11. A tool assembly of the character described, comprising a head rotatable about an axis, a plurality of inside rollers mounted on studs fixedly secured in one end of the head in circumferentially spaced apart relation, around the axis of the head, said rollers being separatedly journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, and an outside roller mounted on a stud fixedly secured in said end of the head and journaled for free rotation about an axis which is fixed relatively to and extending in the direction of the axis of the head and located on a radius greater than the radius passing through the axis of said inside rollers, said outside roller having a frusto-conical wall portion, said inside and outside rollers serving, when said head is rotating and the end of the tube is telescoped forcibly over said inside rollers, to engage the inner and outer surfaces of the end of the tube for performing a swaging action on and forming uniform chamfers around the entire inside and outside peripheral surfaces of said end of the tube.

12. A tool assembly of the character described, comprising a head rotatable about an axis, a plurality of inside rollers mounted on studs fixedly secured in one end of the head in circumferentially spaced apart relation, around the axis of the head, said rollers being separatedly journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, an outside roller mounted on a stud fixedly secured in said end of the head and journaled for free rotation about an axis which is fixed relatively to and extending in the direction of the axis of the head and located on a radius greater than the radius passing through the axis of said inside rollers, said outside roller having a frusto-conical wall portion, said inside and outside rollers serving, when said head is rotating and the end of the tube is telescoped forcibly over said inside rollers, to engage the inner and outer surfaces of the end of the tube for performing a swaging action on and forming uniform chamfers around the entire inside and outside peripheral surfaces of said end of the tube, and a cutting tool fixedly mounted on said one end of the head, in a radial plane intermediate radial planes passing through axes of two adjacent inside rollers for facing said one end of the tube when the latter is forcibly moved over said inside rollers.

13. A tool assembly of the character described, comprising a head rotatable about an axis, a plurality of inside rollers mounted on studs fixedly secured in one end of the head in circumferentially spaced apart relation, around the axis of the head, said rollers being separatedly journaled for free rotation about axes which are fixed relative to and extending in the direction of the axis of the head and each having a frusto-conical outer wall portion, said wall portions cooperating to serve as a guide for telescoping into and centering a freely movable end of a preformed metal tube relative to the axis of the head, and an outside roller mounted on a stud fixedly secured in said end of the head and journaled for free rotation about an axis which is fixed relatively to and extending in the direction of the axis of the head and located on a radius greater than the radius passing through the axis of said inside rollers, said outside roller having a frusto-conical wall portion, and having its axis located in the same radial plane as one of said inside rollers, said inside and outside rollers serving, when said head is rotating and the end of the tube is telescoped forcibly over said inside rollers, to engage the inner and outer surfaces of the end of the tube for performing a swaging action on and forming uniform chamfers around the entire inside and outside peripheral surfaces of said end of the tube.

References Cited by the Examiner
UNITED STATES PATENTS
2,645,000    7/1953    Finch _____ 29—57

RICHARD H. EANES, Jr., *Primary Examiner.*